US007233966B2

(12) United States Patent
Freidhof

(10) Patent No.: US 7,233,966 B2
(45) Date of Patent: Jun. 19, 2007

(54) METHOD AND DEVICE FOR GENERATING AN OUTPUT SIGNAL AS A MATHEMATICAL FUNCTION OF AN INPUT SIGNAL

(75) Inventor: Marcus Freidhof, Taufkirchen (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 640 days.

(21) Appl. No.: 10/321,829

(22) Filed: Dec. 16, 2002

(65) Prior Publication Data

US 2003/0131037 A1 Jul. 10, 2003

(30) Foreign Application Priority Data

Dec. 21, 2001 (DE) ............... 101 63 350

(51) Int. Cl.
*G06F 1/02* (2006.01)
(52) U.S. Cl. .................................. 708/277
(58) Field of Classification Search ............ 708/204, 708/270, 272, 277, 512, 517
See application file for complete search history.

(56) References Cited

U.S. PATENT DOCUMENTS

| 4,078,250 A | * | 3/1978 | Windsor et al. ............ 708/204 |
| 5,359,551 A | | 10/1994 | Pickett |
| 5,524,089 A | * | 6/1996 | Takano .................... 708/517 |
| 5,600,581 A | | 2/1997 | Dworkin et al. |
| 5,604,691 A | | 2/1997 | Dworkin et al. |
| 5,642,305 A | * | 6/1997 | Pan et al. ................... 708/517 |
| 5,831,878 A | | 11/1998 | Ishida |
| 5,951,629 A | * | 9/1999 | Wertheim et al. ........... 708/517 |
| 6,289,367 B1 | * | 9/2001 | Allred ....................... 708/277 |

FOREIGN PATENT DOCUMENTS

WO WO 96/24094 8/1996

* cited by examiner

*Primary Examiner*—Chuong D. Ngo
(74) *Attorney, Agent, or Firm*—Christensen O'Connor Johnson Kindness PLLC

(57) ABSTRACT

A device (1) for generating a digital output signal $y_{LOG}(k)/K$) as a mathematical function of a digital input signal ($x_{LOG}(k)$) includes a level-changing device (6), which by amplifying or attenuating the input signal ($x_{LOG}(k)$) generates a first intermediate signal (A) that falls within a compressed argument range of the mathematical function and a correction signal ($shift_{LOG}$) dependent on the amplification or attenuation of the input signal ($x_{LOG}(k)$). Tabulated function values of the mathematical function are stored at or between indices in a storage device (11). The tabulated function values (B1) are read from the storage device (11) in dependence on the first intermediate signal (A), and a second intermediate signal (B) is generated in dependence on the read tabulated function values (B1). The correction signal ($shift_{LOG}$) is subtracted from the second intermediate signal (B) in a subtractor (12) to yield the digital output signal $y_{LOG}(k)/K$).

5 Claims, 7 Drawing Sheets

METHOD AND DEVICE FOR GENERATING AN OUTPUT SIGNAL AS A MATHEMATICAL FUNCTION OF AN INPUT SIGNAL

CROSS-REFERENCE TO RELATED APPLICATION

This application claims priority benefit under 35 U.S.C. § 119 to German Patent Application No. 101 63 350.5 filed Dec. 21, 2001, which is incorporated herein by reference.

FIELD OF THE INVENTION

The invention concerns a method and a device for generating a digital output signal as a mathematical function of a digital input signal, together with a computer program for implementing the method.

BACKGROUND OF THE INVENTION

By way of example, there are applications in which the logarithm of the magnitude of a complex digital input signal consisting of a real component I and an imaginary component Q must be used to produce, for example, a logarithmically scaled controlled variable. Common practice heretofore has been either to calculate the function value, for example by iterative methods, or to keep the function values in readiness in extensive tables and retrieve them according to the value of the input signal. Calculating function values in real time is so hardware-intensive as to render it ordinarily impracticable. If one table is stored for all the possible values of the input signal, either the storage requirements will be high, or the indices in the table will be so far apart that either the accuracy achieved will be very low or the interpolation method will require much more intensive use of resources to interpolate between indices.

The object on which the present invention is based is to create a method and a device for generating a digital output signal as a mathematical function of a digital input signal, together with a computer program for implementing the method, whose storage requirements for the function table are minimal but by means of which the function values on which the output signal is based can still be determined with high accuracy.

This object is achieved with respect to the methods, devices, and computer programs set forth in greater detail below, and as recited in the claims.

According to the invention, only a compressed argument range of the mathematical function is used, i.e., the range of argument values for which the function is tabulated is sharply limited in comparison to the permissible range of values of the input signal. Within this compressed argument range, the function values can also be tabulated relatively close together to occupy a limited amount of storage space. The level of the input signal is modified, by appropriate amplification or attenuation, in such a way that a signal supplied to the table lies within the compressed argument range in which the mathematical function is tabulated. The amplification or attenuation factor is used to generate a correction signal by means of which the output signal, consisting of the tabulated and potentially interpolated function values, is corrected.

The dependent claims permit advantageous improvements of the invention.

SUMMARY OF THE INVENTION

A linear interpolation among the tabulated function values is preferably used. A considerable simplification can be achieved either by using a uniform, constant increase for the linear interpolation over the entire compressed argument range or by dividing the compressed argument range into a few segments, within each of which a constant increase is used for linear interpolation. In contrast to a linear interpolation in which the increase is determined separately on the basis of the difference quotients at each index, a considerable simplification is achieved with the implementation of linear interpolation. Since the permissible argument range of the tabulated mathematical function is greatly reduced compared to the permissible range of values of the input signal, the losses of accuracy entailed by this simplification of linear interpolation are minimal.

If the square of the magnitude of a complex input signal is to be calculated first, it is advantageous to perform a coarse amplification or attenuation of the input signal, at least in part, even before the magnitude of the signal is squared, and after said squaring to perform a fine amplification or attenuation, where appropriate, and adjust the correction signal accordingly.

BRIEF DESCRIPTION OF THE DRAWINGS

The invention is described in greater detail herein below with reference to the drawing, wherein.

DETAILED DESCRIPTION OF THE PREFERRED EMBODIMENT

Figure 1:
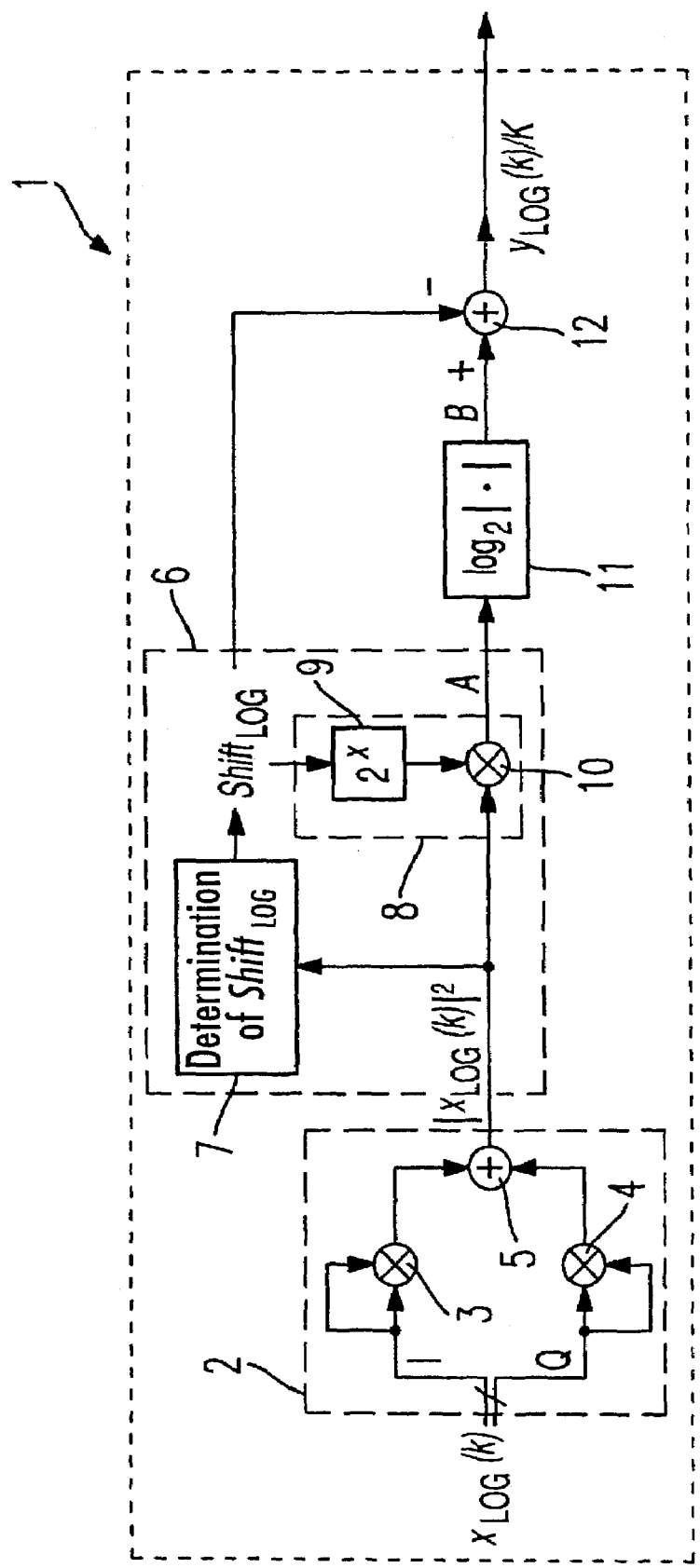
FIG. 1 is a block diagram of a first exemplary embodiment of the device according to the invention.

FIG. 1 shows a first exemplary embodiment of the device 1 according to the invention for implementing the method of the invention. In the exemplary embodiment shown, the device 1 serves to generate, from a digital input signal $x_{LOG}(k)$ consisting of a scanning sequence, a digital output signal $y_{LOG}(k)/K$ also consisting of a scanning sequence, the scanning values of output signal $y_{LOG}(k)/K$ being the logarithm to the base 2 of the scanning values of input signal $x_{LOG}(k)$. The logarithm to the base 2 differs from the logarithm to the base 10 only by the constant K, and thus the scanning sequence $y_{LOG}(k)$ represents the logarithm to the base 10 of the scanning sequence of input signal $x_{LOG}(k)$. The invention lends itself to any desired mathematical functions, particularly monotonic functions, and is not limited to applications involving logarithms.

In the exemplary embodiment shown in FIG. 1, in a square generator 2, first, the square of the magnitude of the input signal $x_{LOG}(k)$ is generated. In applications where the logarithm of the input signal $x_{LOG}(k)$ is to be determined directly, square generator 2 can be omitted. Square generator 2 consists of a first multiplier 3, which squares the real component I of complex input signal $x_{LOG}(k)$, and a second multiplier 4, which squares the imaginary component Q of complex input signal $x_{LOG}(k)$. The squared components are summed in an adder 5, so that the square $|x_{LOG}(k)|^2$ of the magnitude of input signal $x_{LOG}(k)$ is available at the output of square generator 2. This is routed to a level-changing device 6.

Level-changing device 6 amplifies input signal $x_{LOG}(k)$, or, in the exemplary embodiment, the square of the magnitude of input signal $x_{LOG}(k)$, in such a way that a resulting first intermediate signal A falls within a given compressed argument range of the mathematical function—in the exemplary embodiment, the logarithm to the base 2. In the preferred exemplary embodiment, the compressed argument range of the logarithm to the base 2 is the interval [0.5, 1). In the preferred exemplary embodiment shown, the amplification is performed by shifting the significance of the bits representing the square of the magnitude of the input signal. To this end, first, a determining device 7, using a method to be set forth hereinbelow, determines the number $shift_{LOG}$ of bits by which the significance of the square of the input signal magnitude must be raised in order to fall within the compressed argument range [0.5, 1). The number of this shift bit $shift_{LOG}$ thus constitutes a correction signal by which the function values must subsequently be corrected. In the most general terms, the amplification factor can also be an odd power of the base 2, but in that case, amplification by bit shifting and subsequent correction by simple subtraction are not possible. If, as in the exemplary embodiment shown, the amplification is effected by bit shifting, then instead of a true multiplier a bit shifter 8 can be used. The bit shifter 8 is depicted as exponentiator 9 and multiplier 10. Negative amplification (attenuation) is also possible.

The first intermediate signal A is routed to a function-value-determining device 11, which outputs as a second intermediate signal B the function values of the mathematical function that are among the scanning values of the first intermediate signal A. In the exemplary embodiment shown, the function-value-determining device 11 generates the logarithm to the base 2 of each first intermediate signal A as second intermediate signal B.

Second intermediate signal B is corrected by means of the correction signal $shift_{LOG}$. For this purpose, the correction signal must be conditioned with the same mathematical function, here the logarithm to the base 2. If, however, the amplification factor, as in the exemplary embodiment shown, is an even power of the base 2, then the value $shift_{LOG}$ is the corresponding power to the base 2, and the correction can be made simply by subtracting the correction signal $shift_{LOG}$ from second intermediate signal B in a subtractor 12. This yields the output signal $y_{LOG}(k)/K$. If another mathematical function than the logarithm is used, then an appropriate different correcting element 12 must be used in place of the subtractor.

Since only the magnitude is needed and the logarithm is determined subsequently, it is not the magnitude, but the square of the magnitude that is determined. The logarithm then merely yields a constant factor:

$$20 \cdot \log_{10}|x_{LOG}(k)| = 10 \cdot \log_{10}|x_{LOG}(k)|^2. \quad (1)$$

The square of $x_{LOG}(k)$ can be determined simply by multiplication:

$$|x_{LOG}(k)|^2 = Re\{x_{LOG}(k)\}^2 + Im\{x_{LOG}(k)\}^2 \quad (2)$$

The logarithm is to be determined by a tabular method. However, use of the table yields only an approximate value for $y_{LOG}(k)$. The error due to the approximation should be, for example, less than 0.001 dB. To achieve such high accuracy over the entire range of values of the logarithm with an exclusively tabular method, it would be necessary to construct a very large table (about 120K words). The size of the table can be reduced markedly via simplifications according to the invention. One important simplification is the use of bit shifter 8 at the table input. The input values of the table (the result of computation of the square) are multiplied by the factor 2 until the input value (first intermediate signal A) lies within the range of values $$\frac{1}{2} \le 2^{Shift_{LOG}} \cdot |x_{LOG}(k)|^2 < 1 \quad (3)$$

The multiplication performed at the input of the logarithmizer can be cancelled by subtraction at the output:

$$\log_{10}(|x_{LOG}(k)|^2) = \log_{10}(2^{Shift_{LOG}} \cdot |x_{LOG}(k)|^2) - \log_{10}(2^{Shift_{LOG}}) \quad (4)$$

Thus, the table needs to cover only the range of input values [0.5, 1). In the case of a logarithm having the base 10, a table giving the logarithms of the powers of 2

$$\log_{10}(2^{Shift_{LOG}})$$

would have to be created. This can be avoided by using the logarithm to the base 2. The relation is as follows:

$$10 \cdot \log_{10}|x_{LOG}(k)|^2 = \frac{10}{\log_2(10)} \cdot \log_2|x_{LOG}(k)|^2 \quad (5)$$

$$= \frac{10}{\log_2(10)} \cdot (\log_2(2^{Shift_{LOG}} \cdot |x_{LOG}(k)|^2)) - (\log_2(2^{Shift_{LOG}}))$$

$$= \frac{10}{\log_2(10)} \cdot (\log_2(2^{Shift_{LOG}} \cdot |x_{LOG}(k)|^2) - Shift_{LOG})$$

There is no longer any need for a table giving the power of 2, and the shift factor $shift_{LOG}$ can be subtracted directly. The factor $$K = \frac{10}{\log_2(10)} \quad (6)$$

can be taken into account in the output signal $y_{LOG}(k)$.

In the block diagram of FIG. 1, two multipliers 3 and 4 with a high word size are needed to calculate the square. Once the square has been calculated, the result is amplified by shifting until it falls within the range of the table that defines the logarithm (the compressed argument range). If this amplification is performed even before the square is computed, multipliers 3, 4 no longer need to have a high word size. The following relation applies:

$$|x_{LOG}(k)|^2 = \left(\underbrace{\text{Re}\{x_{LOG}(k)\}}_{I(k)}\right)^2 + \left(\underbrace{\text{Im}\{x_{LOG}(k)\}}_{Q(k)}\right)^2 = I(k)^2 + Q(k)^2. \quad (7)$$

If $|x_{LOG}(k)|^2$ is very large, it is not necessary to use such wide multipliers to calculate the square. Minor errors in the calculation are acceptable if the logarithm is to be determined accurately only to 0.001 dB, for example. If the square were small, however (the input values also being small), decreasing the word size of the multiplier would lead to material errors. This can be avoided if the subsequent amplification is moved to a position ahead of the multiplier. It is true that before the square is calculated, it is not yet known which shift factor shift$_{LOG}$ will result. The square has to be calculated before this shift factor can be determined. However, a very good estimate of the shift factor can be calculated from the input values themselves. At the input to the calculation of the square, the input values are amplified by means of the shift factor shift$_{IQ}$:

$$|2^{ShiftIQ} \square x_{LOG}(k)|^2 = (2^{ShiftIQ} \square I(k))^2 + (2^{ShiftIQ} \square Q(k)) \\ = 2^{shiftIQ} \square |x_{LOG}(k)|_2. \quad (8)$$

The shift factor shift$_{IQ}$ is selected so that the input values make the fullest possible use of their range of values. This is the case when either the real or the imaginary part fulfills one of the following inequalities:

$$0,5 \le 2^{Shift_{IQ}} \cdot \begin{Bmatrix} I(k) \\ Q(k) \end{Bmatrix} < 1 \text{ or } -1 \le 2^{Shift_{IQ}} \cdot \begin{Bmatrix} I(k) \\ Q(k) \end{Bmatrix} \le -0,5. \quad (9)$$

The amplification should not proceed so far that one of the two parts leaves its range of values. Consequently, the following relations must also hold:

$$-1 \le 2^{ShiftIQ} \cdot I(k) < 1 \text{ and } -1 \le 2^{ShiftIQ} \cdot Q(k) < 1 \quad (10)$$

These initially complicated-seeming rules can be implemented in a simple manner. The bit shift is performed in five steps, for example. The shift factors of these steps are 16, 8, 4, 2 and 1. The shift by a factor of 16 is the first to be performed. At each step, it is merely necessary to verify that all the leading bits (MSB) pushed out by that shift are identical.

If the rules deriving from Inequalities (9) and (10) are complied with, then the range of values for the square is:

$$0,25 \le 2^{2 \cdot ShiftIQ} \cdot |x_{LOG}(k)|^2 < 2. \quad (11)$$

Based on Inequality (3), the input value to the table must fall within the interval [0.5, 1). For this reason, another bit shifter with three stages must now be provided:

$$0,5 \le 2^{2 \cdot ShiftIQ} \cdot 2^{ShiftCorr} \cdot |x_{LOG}(k)|^2 < 1 \text{ with Shift}_{Corr} \in \{-1,0,1\} \quad (12)$$

Figure 2:
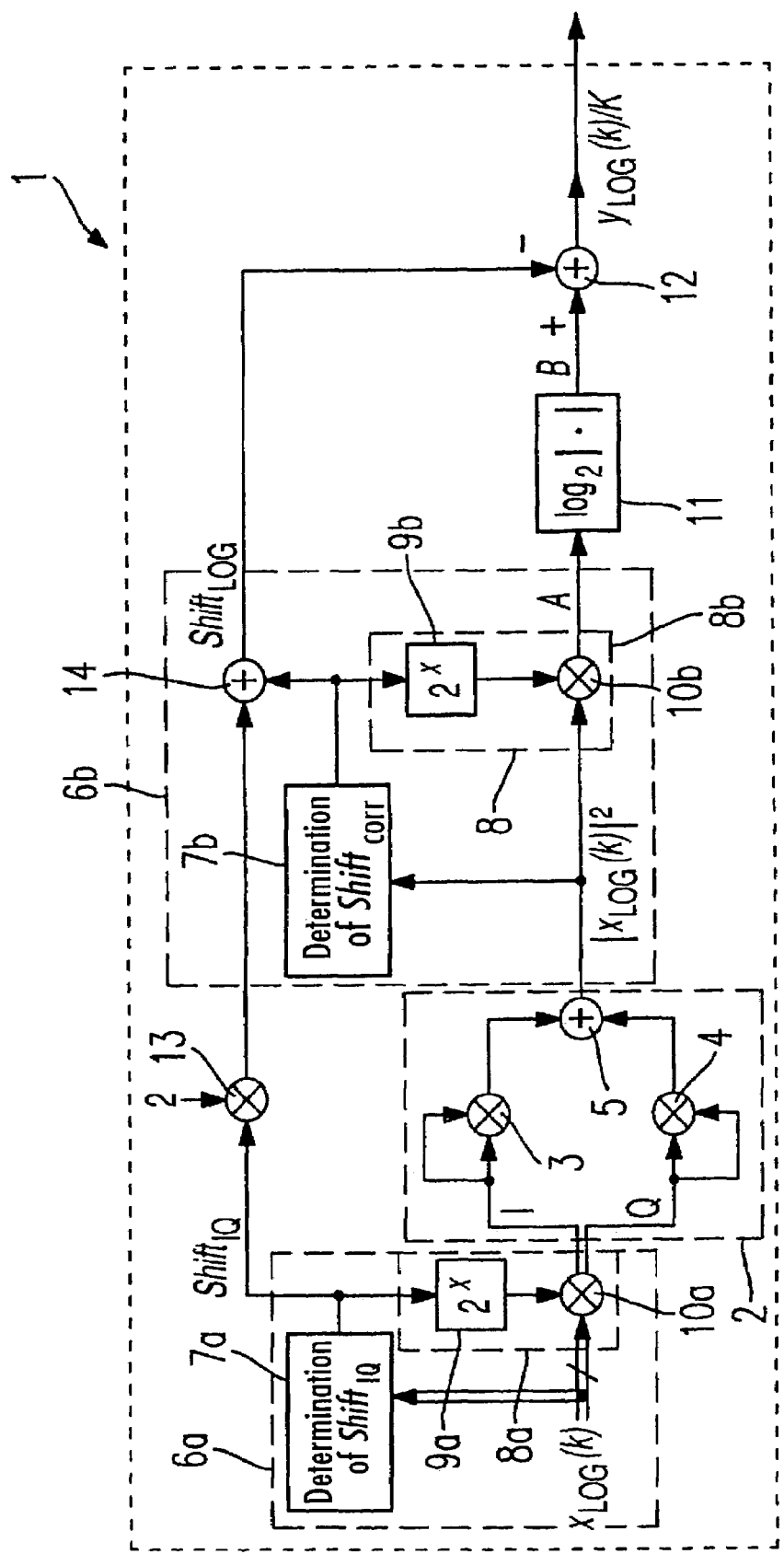
FIG. 2 is a block diagram of a second exemplary embodiment of the device according to the invention.

FIG. 2 shows a second exemplary embodiment of the device of the invention for implementing the method of the invention with the aforedescribed two-stage amplification. Elements that are the same as in FIG. 1 have been given the same reference characters and will not be described again. In the exemplary embodiment of FIG. 2, level-changing device 6 includes a first level-changing subdevice 6a disposed before the input of quantity-forming device 2, and a second level-changing subdevice 2b disposed after the output of square generator 2. The correction signal shift$_{LOG}$ is composed of a first correction subsignal shift$_{IQ}$ generated by first level-changing subdevice 6a and a second correction subsignal shift$_{corr}$ generated by second level-changing subdevice 6b. For this purpose, the first correction subsignal shift$_{IQ}$ is multiplied by the factor 2, as stated in Inequality (12), in a bit shifter 13 depicted as a multiplier, and the result is added in an adder 14 to the second correction subsignal shift$_{corr}$ to yield the resulting correction signal shift$_{LOG}$.

Figure 4:
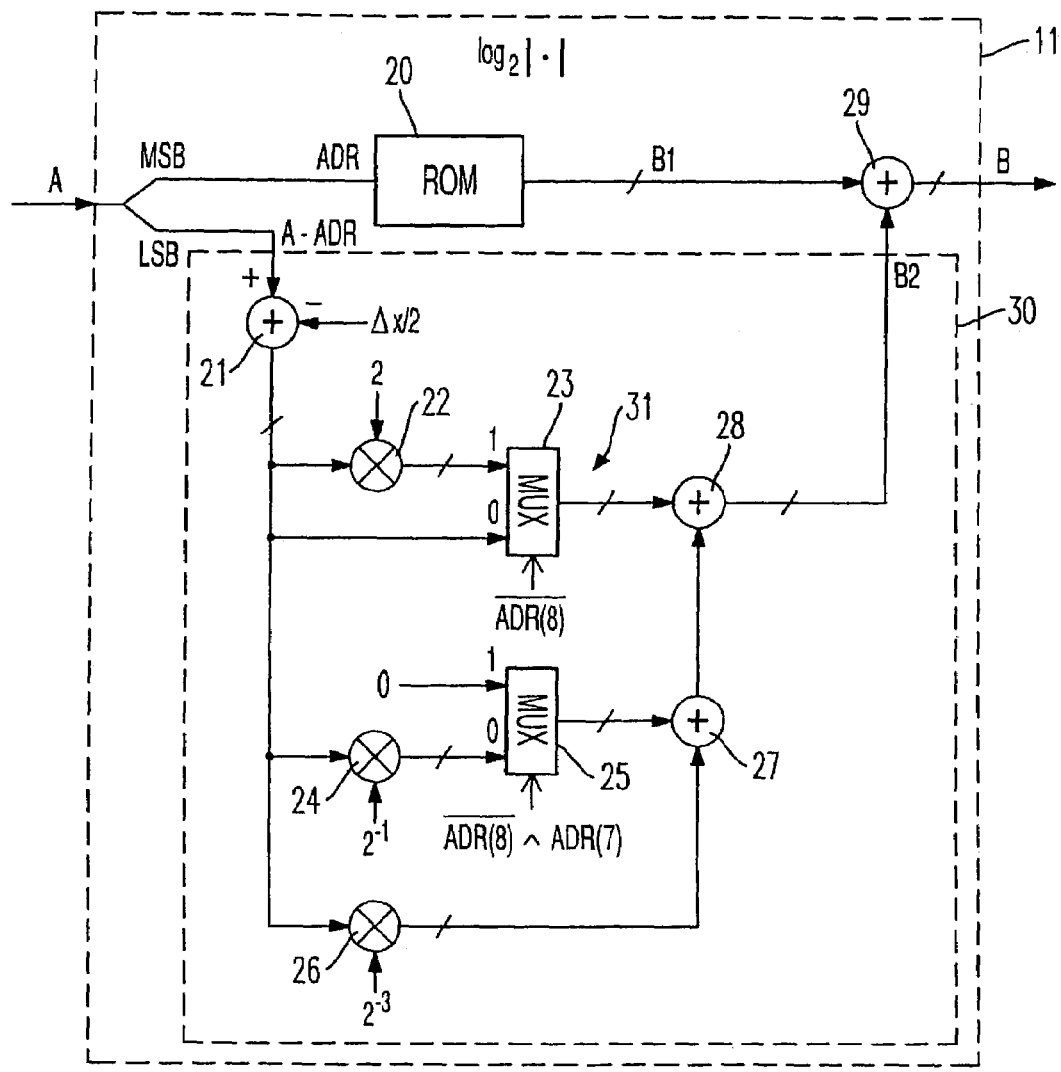
FIG. 4 shows a preferred embodiment of a detail of the exemplary embodiments of the device according to invention shown in FIGS. 1 and 2.

FIG. 4 is a detailed diagram of the function-value-determining device 11 used in the exemplary embodiments of FIGS. 1 and 2. Intermediate signal A is supplied to one input of function-determining device 11. Some of the most significant bits MSB, for example the eight most significant bits, form the address word ADR, which is routed to a storage device 20, for example a ROM (read-only memory). Stored at or preferably between the indices in storage device 20 are function values of the mathematical function to be represented—in the exemplary embodiment, the logarithm to the base 2. As described above, the amplification or attenuation of the input signal that takes place during the generation of first intermediate signal A ensures that first intermediate signal A will fall within a compressed argument range of the mathematical function—in the exemplary embodiment, within the interval [0.5, 1). Assuming a set storage capacity for storage device 20, owing to this compressed argument range the indices can be placed relatively close together; hence, the very compression of the argument range brings about relatively high accuracy for the function values B1 tabulated at or between the indices.

In the exemplary embodiment shown, the accuracy is increased further by the fact that a linear interpolation, i.e., an interpolation of the first order, is performed among the tabulated function values B1. However, according to the invention the linear increase used for linear interpolation is not taken into account individually for each index in the table, for example by generating a difference quotient, but instead, either a uniform linear increase is used for the entire argument range, or the argument range is divided into multiple segments and the linear increase is constant within each of them.

Figure 3:
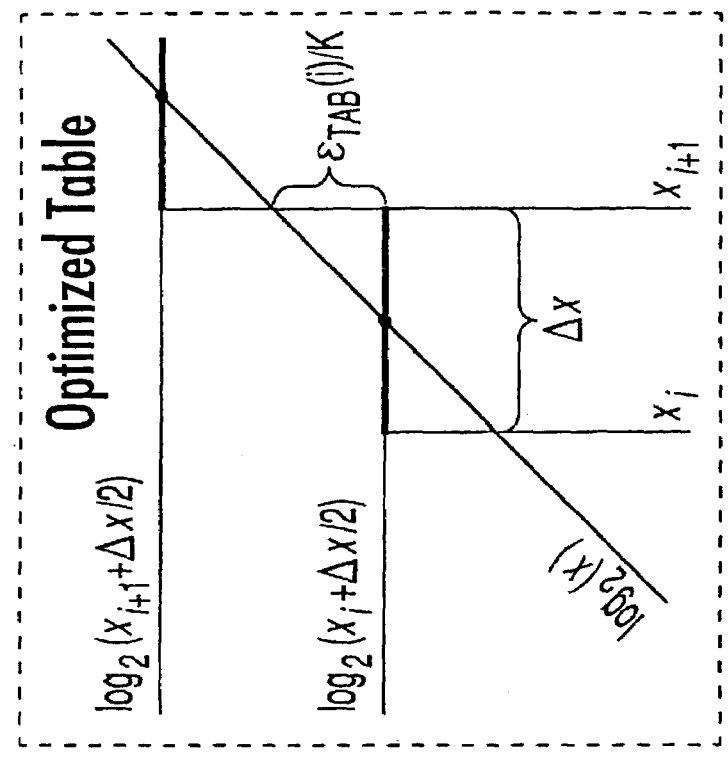
FIG. 3 consists of two diagrams elucidating the tabulation of the mathematical function.
Figure 3:
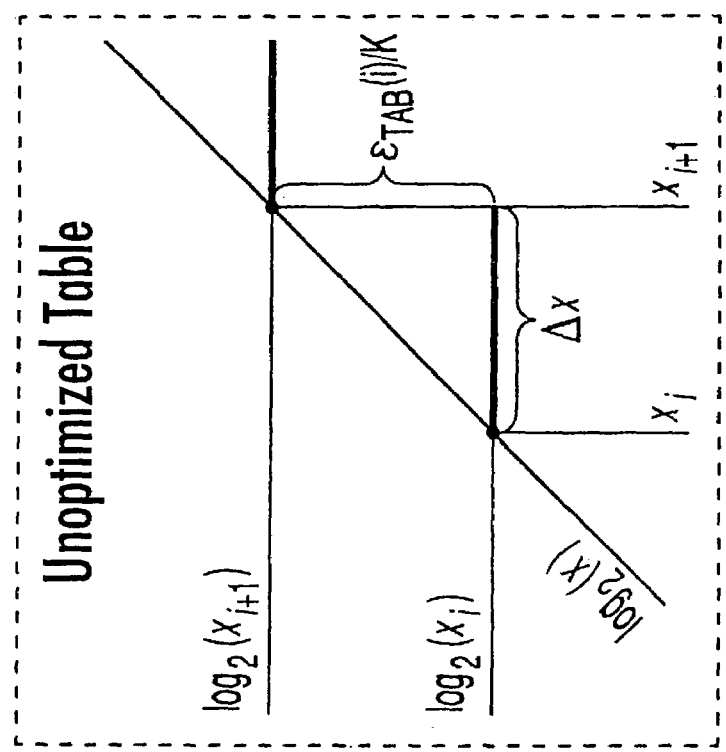
Figure 7:
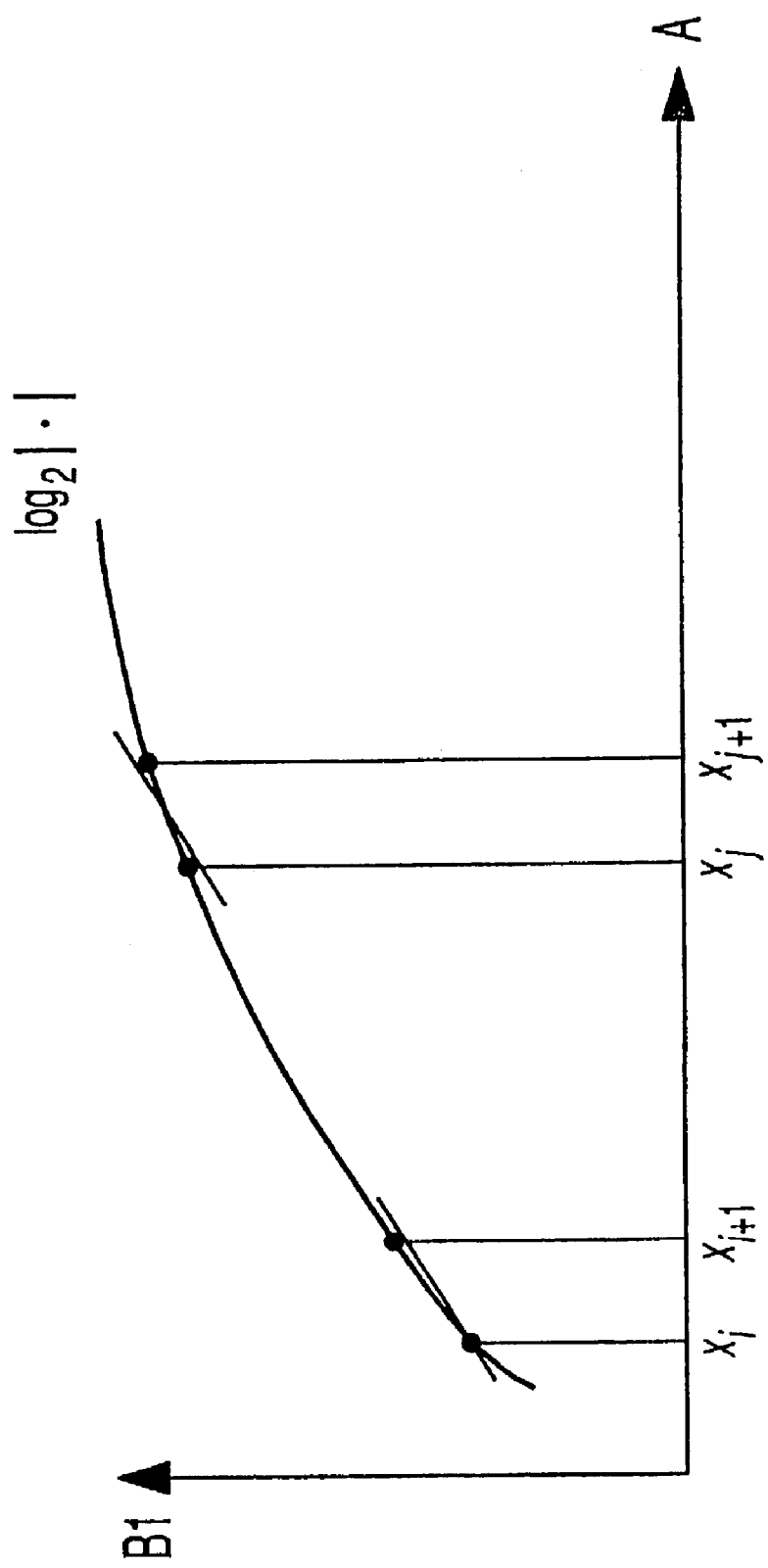
FIG. 7 is a diagram elucidating the linear interpolation procedure.

FIG. 7 clarifies this approach. It represents the logarithm to the base 2 as a function of the first intermediate signal A. One function value B1 is tabulated in storage device 20 between the indices $x_i$ and $x_{i+1}$, $x_j$ and $x_{j+1}$, etc. Linear interpolation is performed among these tabulated function values. The straight lines used for the interpolation are shown in FIG. 7. It can be seen that the linear increase is always independent of the position of the index. FIG. 3 makes it apparent that it is more advantageous with regard to tabular error $\epsilon_{TAB}(i)/K$ to store the function values in storage device 20, not at the indices $x_i$, $x_{i+1}$, etc., but at the positions between them, i.e., for example at the position $(x_i+x_{i+1})/2$. This reduces the tabular error $\epsilon_{TAB}(i)/K$ by half.

When a uniform, constant increase $m_{const}$ is used for linear interpolation over the entire compressed argument range, then it can be demonstrated, for the case in which the mathematical function is the logarithm to the base 2 and the compressed argument range lies between 0.5 and 1, that for the constant increase $m_{const}$ at which the lowest maximum interpolation error occurs:

$$m_{const} = 3/(2 \cdot \ln 2) = 2.164 \quad (13)$$

Figure 5:
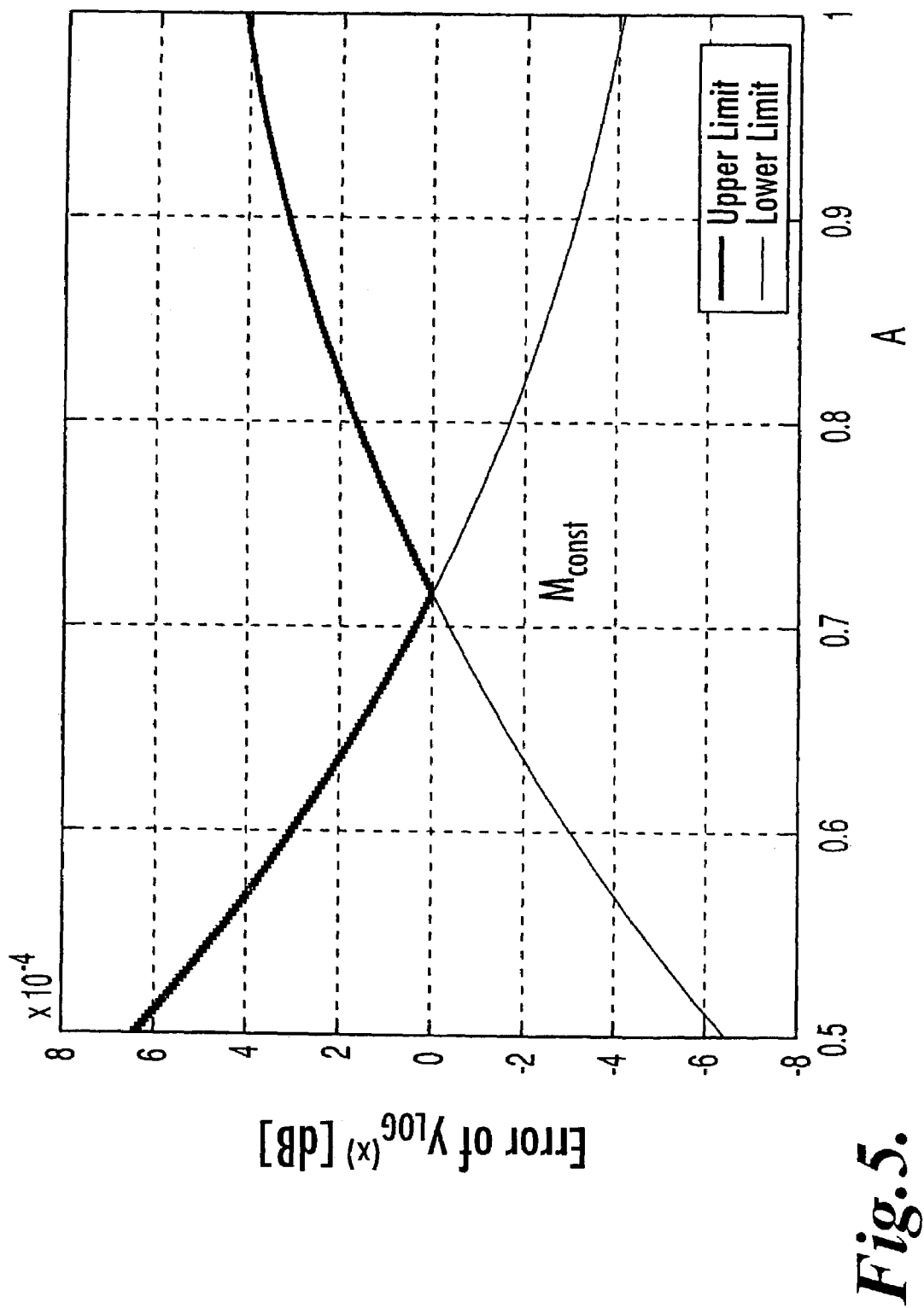
FIG. 5 is the calculation error as a function of the signal supplied to the table in the case of linear interpolation using a uniform, constant increase.

However, the rounded constant increase $m_{const}=2$ is easier to implement. The error in the output signal $y_{LOG}(x)$ that arises when $m_{const}=2$ is depicted in FIG. 5 as a function of first intermediate signal A.

As mentioned hereinabove, the interpolation error can be reduced still further by dividing the argument range into multiple segments $I_1$, $I_2$, $I_3$, with an increase that is constant within each segment but differs from one segment to the next. For example, the compressed argument range [0.5, 1) can be divided into the segments $$I_1 : \frac{1}{2} \leq A < \frac{5}{8} \quad (14)$$

$$I_1 : \frac{5}{8} \leq A < \frac{3}{4}$$

$$I_1 : \frac{3}{4} \leq A < 1$$

Figure 6:
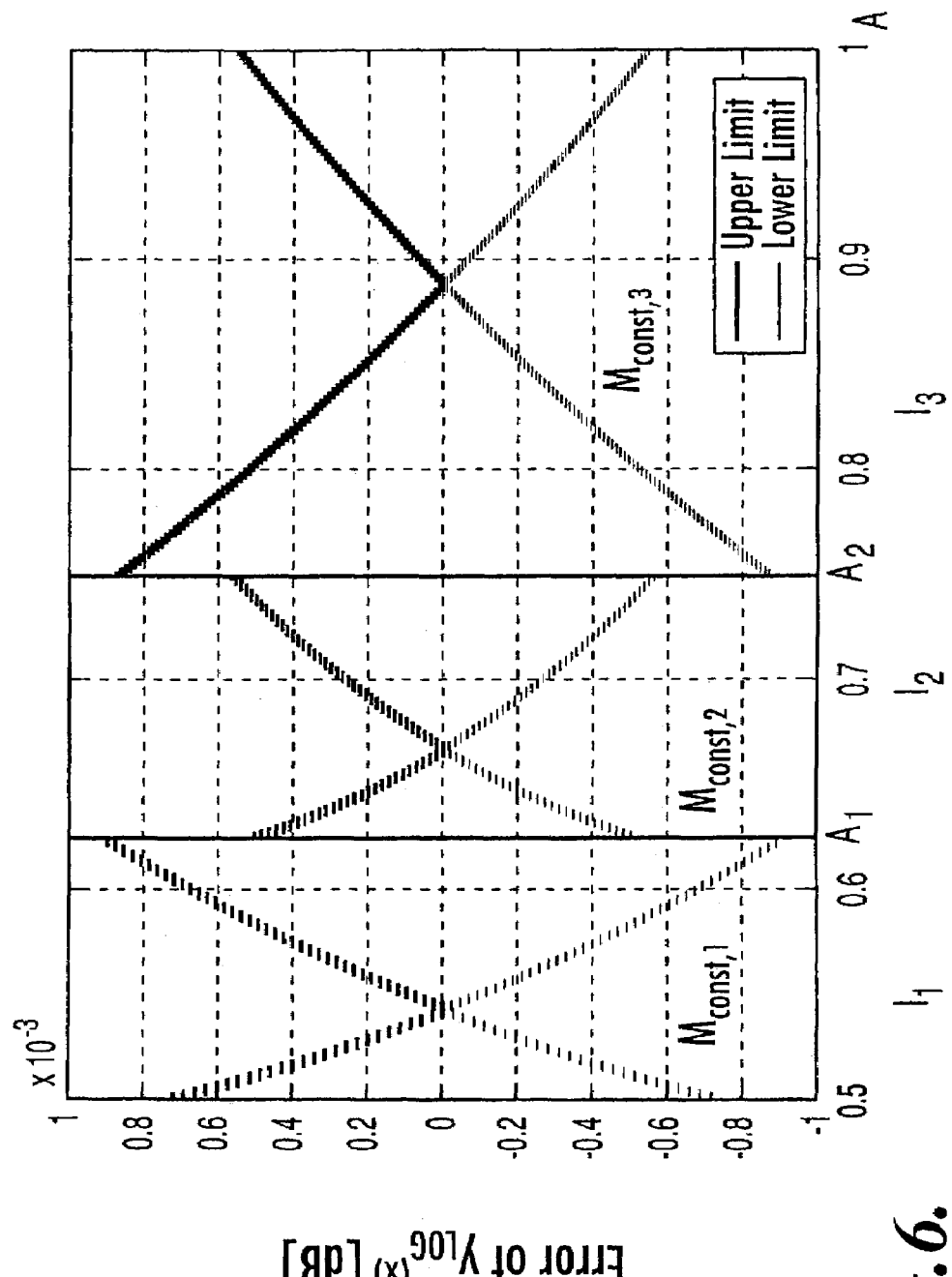
FIG. 6 is the calculation error as a function of the signal supplied to the table with the use of three respectively constant increases in different segments in the case of linear interpolation.

For these range limits $A_1 = 5/8$, $A_2 = 3/4$, depicted in FIG. 6, it can be shown that the optimum increase to be used for linear interpolation in the three different segments $I_1$, $I_2$ and $I_3$ can be expressed by:

$$I_1 : m_{const,1} = \frac{9}{5 \cdot \ln 2} \approx 2.5969 \approx 2.625 = 2 + 2^{-1} + 2^{-3} \quad (15)$$

$$I_2 : m_{const,2} = \frac{22}{15 \cdot \ln 2} \cdot \ln 2 \approx 2.1160 \approx 2.125 = 2 + 2^{-3}$$

$$I_3 : m_{const,3} = \frac{7}{6 \cdot \ln 2} \approx 1.6831 \approx 1.625 = 1 + 2^{-3}$$

The rounded values can be represented as a combination of integral powers of 2, and thus the multiplication operations performed during the linear interpolation can be performed by bit shifting without placing very great demands on the hardware.

Although the index width $\Delta x$ used in the example of FIG. 6 was four times that of the example of FIG. 5, the error did not increase substantially.

The implementation for the aforesaid example is shown in FIG. 4. The less significant bits, which are not included in the address word ADR, form the data word A-ADR and are routed to an interpolator 30. A subtractor 21 of the interpolator subtracts from the data word A-ADR the value $\Delta x/2$ that occurs in each case, $\Delta x$ being the distance between two indices. This allows for the circumstance noted in reference to FIG. 3, that the function values B1 are each tabulated between the indices, making this correction necessary.

The output of subtractor 21 is connected to a first multiplexer 23 both directly and via a bit shifter 22 that increases the significance of the output values of subtractor 21 by one position at a time. The output of subtractor 21 is further connected, via a second bit shifter 24 that decreases the significance of the bits from the output of subtractor 21 by one position at a time, to a second multiplexer 25 to the other output of which the data value "0" is constantly supplied. Via a third bit shifter 26, which decreases the bits representing the output values of subtractor 21 by three positions, a first input of a first adder 27 is connected to the output of subtractor 21. The other input of the first adder 27 is connected to the output of the second multiplexer 25. A first input of a second adder 28 is connected to the output of first adder 27, while a second input of second adder 28 is connected to the output of first multiplexer 23. The interpolation values B2 are available at the output of second adder 28. The function value B1 read from storage device 20 and the interpolation values B2 are supplied to the inputs of a third adder 29. The second intermediate signal B is then available at the output of third adder 29.

Multiplexers 23 and 25 perform the task of switching among the mutually different but intrasegmentally constant increases $m_{const,3}$, $m_{const,2}$ and $m_{const,1}$ in dependence on the exemplary values given hereinabove. For this purpose, multiplexer 23 connects the input labeled "1" to its output if the eighth bit, ADR(8), of the address word ADR is not set. Otherwise, the input of first multiplexer 23 labeled "0" is connected to its output. Second multiplexer 25 connects its input labeled "1" to its output if the eighth bit, ADR(8), of the address word ADR is not set or the seventh bit, ADR(7), of the address word ADR is set. As can be seen from simple logical combination, this implements the exemplary values given in Eqs. (15) for the different increases in the various segments $I_1$, $I_2$, $I_3$ of the compressed argument range. Bit shifters 22, 24, 26, multipliers 23, 25 and adders 27, 28 thus form a switchable multiplication system 31.

The invention is not limited to the exemplary embodiment described, and also lends itself to any desired mathematical functions. The invention can be implemented both as hardware in the form of an electronic circuit, especially an FPGA (free-programmable gatter array), and as software, for example in a digital signal processor.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A device (1) for generating a digital output signal ($y_{LOG}(k)/K$) as a mathematical function of a digital input signal ($x_{LOG}(k)$), comprising
    a level-changing device (6) which by amplifying or attenuating the input signal ($x_{LOG}(k)$) generates a first intermediate signal (A) that falls within a compressed argument range of said mathematical function, and a correction signal ($Shift_{LOG}$) that depends on the amplification or attenuation of said input signal ($x_{LOG}(k)$),
    a storage device (20) in which function values of said mathematical function are stored at or between indices ($x_i$, $x_{i+1}$; $y_i$, $y_{i+1}$), the tabulated function values (B1) being read from said storage device (20) in dependence on said first intermediate signal (A) and a second intermediate signal (B) being generated in dependence on the read tabulated function values (B1), and
    a correcting element (12) that generates said digital output signal ($y_{LOG}(k)/K$) by correcting said second intermediate signal (B) by means of said correction signal ($Shift_{LOG}$),
    wherein an interpolator (30) generates interpolation values (B2) in dependence on the deviation of said first intermediate signal (A) from said indices ($x_i$, $x_{i+1}$, $y_i$, $y_{i+1}$), and an adder (29) sums said tabulated function values (B1) and said interpolation values (B2), and
    wherein in said interpolator (30) a linear interpolation is performed using increases $m_{const\ 1}$, $m_{const\ 2}$, $m_{const\ 3}$) that are each constant within segments ($I_1$, $I_2$, $I_3$) of said compressed argument range, and a switchable multiplication system (31) is provided that multiplies a multiplier (A-ADR-$\Delta x/2$) corresponding to the deviation of said first intermediate signal (A) from reference positions (($x_i + x_{i+1})/2$, ($y_i$, $y_{i+1})/2$)) defined by the indices ($x_i$, $x_{i+1}$, $y_i$, $y_{i+1}$), depending on the segment ($I_1$, $I_2$, $I_3$) in which said intermediate signal (A) is located, by the constant increase ($m_{const\ 1}$, $m_{const\ 2}$, $m_{const\ 3}$) appertaining to the segment ($I_1$, $I_2$, $I_3$) concerned.

2. The device as recited in claim 1, characterized in that said switchable multiplication system (31) comprises bit shifters (22, 24, 26) that shift the significance of the bits of said multiplier (A-ADR-Δ/2), inultiplexers (23, 25) and adders (27, 28).

3. The device as recited in claim 1 or 2, characterized in that
a square generator (2) is provided, which squares a real component (I) and an imaginary component (Q) of said digital input signal ($x_{LOG}(k)$) and sums the squared components.

4. The device as recited in claim 3, characterized in that said level-changing device (6) comprises a first level-changing subdevice (6a) disposed before the input of said square generator (2) and a second level-changing subdevice (6b) disposed after the output of said square generator (2), and said correction signal ($Shift_{LOG}$) is composed of a first correction subsignal ($Shift_{IQ}$) generated by said first level-changing subdevice (6a) and a second correction subsignal ($Shift_{CORR}$) generated by said second level-changing subdevice (6b).

5. The device as recited in claim 1, characterized in that said mathematical function represents the logarithm to a specified base and said correction signal ($Shift_{LOG}$) represents the exponent (x) of the same base of an amplification factor ($2^x$) used in said level-changing device, and
said correcting element is a subtractor (12) that subtracts said correction signal ($Shift_{LOG}$) from said second intermediate signal (B).

* * * * *

UNITED STATES PATENT AND TRADEMARK OFFICE
CERTIFICATE OF CORRECTION

PATENT NO. : 7,233,966 B2 Page 1 of 1
APPLICATION NO. : 10/321829
DATED : June 19, 2007
INVENTOR(S) : M. Freidhof It is certified that error appears in the above-identified patent and that said Letters Patent is hereby corrected as shown below:

| COLUMN | LINE | ERROR |
|---|---|---|
| Title Page (75) | Inventor | "Marcus" should read --Markus-- |
| 8 (Claim 1, | 52 line 24) | "$y_i, y_{i+1}$)," should read --$y_i, y_{i+1}$),-- |
| 9 (Claim 2, | 2 line 4) | "inultiplexers" should read --multiplexers-- |

Signed and Sealed this

Twenty-eighth Day of August, 2007

JON W. DUDAS
*Director of the United States Patent and Trademark Office*

UNITED STATES PATENT AND TRADEMARK OFFICE
CERTIFICATE OF CORRECTION

PATENT NO. : 7,233,966 B2
APPLICATION NO. : 10/321829
DATED : June 19, 2007
INVENTOR(S) : M. Freidhof Page 1 of 1

It is certified that error appears in the above-identified patent and that said Letters Patent is hereby corrected as shown below:

| COLUMN | LINE | ERROR |
|---|---|---|
| 8 (Claim 1, | 55 line 27) | "$m_{const\ 1}, m_{const\ 2}, m_{const\ 3}$" should read --$m_{const.1}, m_{const.2}, m_{const.3}$-- |
| 8 (Claim 1, | 61 line 33) | "$((x_i+_{x+1})/2,$" should read --$((x_i+x_{i+1})/2,$-- |
| 8 (Claim 1, | 64 line 36) | "$m_{const\ 1}, m_{const\ 2}, m_{const\ 3}$" should read --$m_{const.1}, m_{const.2}, m_{const.3}$-- |

Signed and Sealed this

Twenty-fifth Day of September, 2007

JON W. DUDAS
*Director of the United States Patent and Trademark Office*